Dec. 17, 1940.　　　H. F. PITCAIRN　　　2,225,525
AIRCRAFT WITH ROTATING AIRFOILS
Filed Feb. 16, 1938　　　3 Sheets-Sheet 1
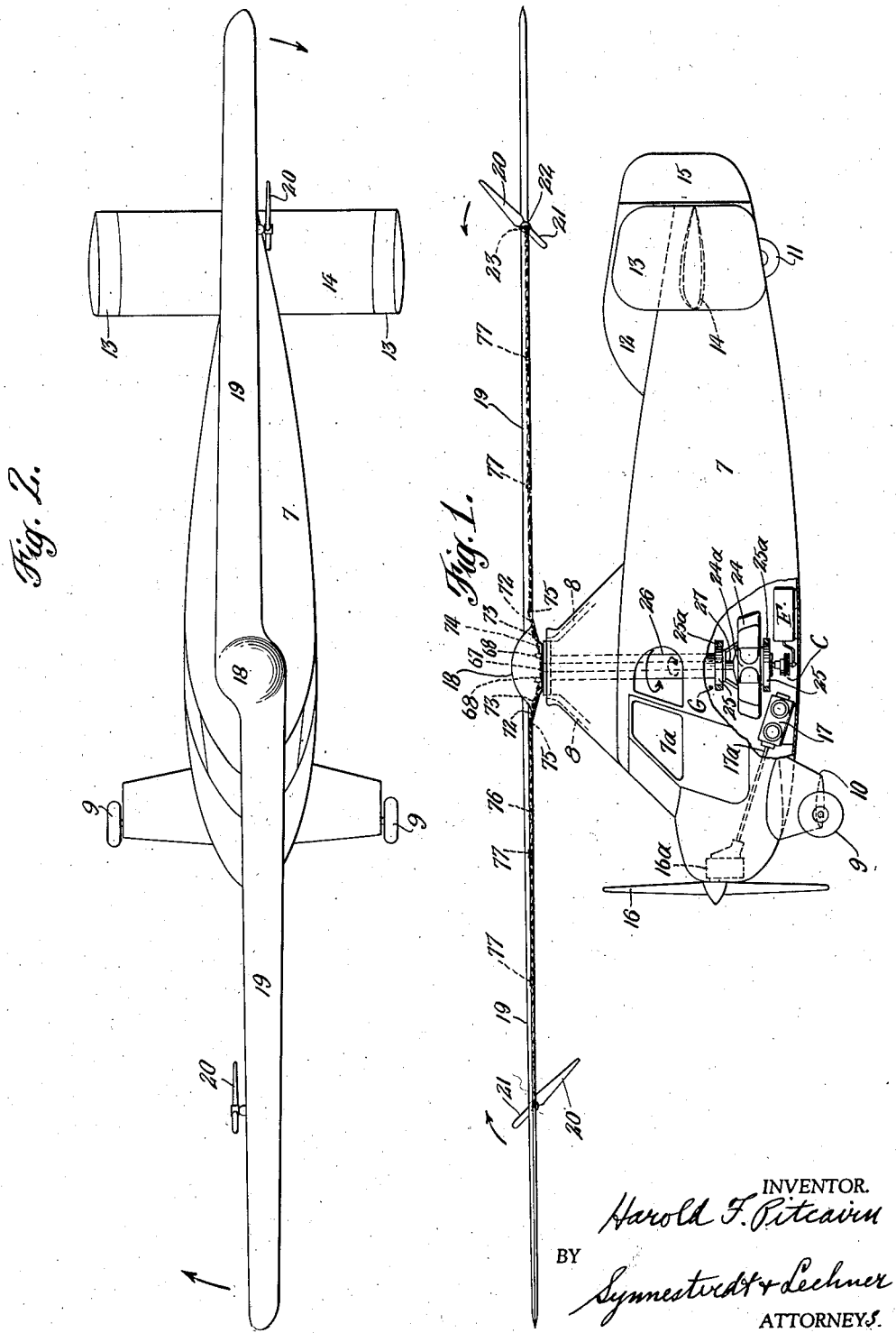
INVENTOR.
Harold F. Pitcairn
BY Synnestvedt & Lechner
ATTORNEYS.

INVENTOR.
Harold F. Pitcairn
BY
Synnestvedt + Lechner
ATTORNEYS

Dec. 17, 1940. H. F. PITCAIRN 2,225,525
AIRCRAFT WITH ROTATING AIRFOILS
Filed Feb. 16, 1938 3 Sheets-Sheet 3

INVENTOR.
Harold F. Pitcairn
BY
Synnestvedt & Lechner
ATTORNEYS

Patented Dec. 17, 1940

2,225,525

UNITED STATES PATENT OFFICE 2,225,525

AIRCRAFT WITH ROTATING AIRFOILS

Harold F. Pitcairn, Bryn Athyn, Pa., assignor, by mesne assignments, to Autogiro Company of America, a corporation of Delaware Application February 16, 1938, Serial No. 190,828

7 Claims. (Cl. 244—17)

This invention relates to aircraft with rotating airfoils, wherein the rotating surfaces are employed for sustension and/or propulsion of the machine, and preferably also for purposes of control in flight, and also to bladed rotor systems, the invention being particularly applicable to and advantageous in machines wherein the rotating blades or wings are arranged to exert their thrust primarily in a vertical direction, though in its broader aspects the invention is not limited in this respect. The objects and advantages of the invention will be more clearly understood after a brief reference to certain problems in this art.

In machines operating in a fluid medium, such as aircraft, the delivery of power to a system of rotor blades produces, by the torque reaction, a tendency of the body of the machine to rotate in the opposite direction, which in the case of helicopters or the like has been difficult if not impossible to counteract or control. This is especially true where the machine is intended to be capable of hovering or of slow translational or vertical flight, since under such conditions there is little or no relative speed between the machine and the atmosphere by which a corrective force might be applied aerodynamically.

One of the most common expedients proposed to overcome this difficulty is the employment of a pair of oppositely turning rotors. While it is theoretically possible to transmit power efficiently to such a pair of rotors and to cancel out the effects of the torque reactions, there are serious practical problems and disadvantages, as will now appear.

If two sustaining rotors are placed in side-by-side relation, a heavy transverse truss or frame structure must be employed in the mounting and support of the rotors, and this also involves excessive drag. Similar losses, and aerodynamic interference of one rotor with the other, are present if the rotors are placed in tandem. If the rotors are placed in superimposed relation, one operates in the down-wash of the other, and if the rotor blades are articulated for flapping movements generally transverse their rotative paths (which is the most practical form of rotor construction) the rotor centers must be substantially spaced apart in the vertical direction to obtain adequate clearance, with the result that the machine has a high center of gravity which introduces serious problems as to lateral stability.

With any double or multiple arrangement there is excessive weight and drag, and loss of efficiency, due to the duplication of hubs, driving means, and other parts. Also, particularly because the central region of a rotor is the least efficient, a plurality of rotors, taken together, are less efficient than is a single rotor having a "disk" area equal to the sum of the areas of such a plurality of rotors.

In machines having only a single rotor, power driven in flight, it has been proposed to counteract the torque by the use of anti-torque vanes operating in the down-wash of the rotor, or by auxiliary airscrews mounted on the body of the machine and acting in a direction opposite to the torque reaction, or other equivalent devices, from all of which flow power losses, control problems, and the like. It has also been proposed to mount an engine on each rotor blade, each such engine driving one or more airscrews adapted to pull the rotor blade around in its circular path, but this involves in any rotor a prohibitive degree of centrifugal force and of bending moments on the blades, an excessively high center of gravity for the machine, the practical impossibility of securing autorotation of the rotor system upon failure of the engines, great difficulty in securing static and dynamic balance of the rotor, and excessive drag and loss of efficiency; and in rotors having articulated blades it involves excessive loads on the blade pivots, problems in making the control connections to the engines, and substantial interference with the flapping and/or other articulative movements of the blades.

The present invention contemplates, in general, the minimization or elimination of the foregoing difficulties of the prior art, more particularly by the elimination, in a practical and efficient way, of the reactive torque effect upon the body of a machine wherein a single rotative sustaining and/or propelling system is employed and is driven in flight by an engine or other prime mover; and the invention further contemplates accomplishing this in such a manner that the reactive torque of the prime mover, instead of being counteracted by some auxiliary means to set up a balancing torque, is employed to do useful work.

In effectuation of the foregoing, the invention contemplates the direct utilization of the reactive torque of the prime mover in driving the rotative blades or wings.

The invention further contemplates an aircraft construction wherein the engine which actuates the sustaining rotor, though mounted in or on the body of the machine, sets up no substantial torque reaction in the body.

More specifically, the invention involves an aircraft sustaining, and/or controlling and/or propelling system comprising a hub with rotative wings or blades thereon, and an engine having a casing member and a relatively rotatable shaft member, one of said members being mounted to rotate with said hub and the other of said members being adapted to actuate blade driving means through the intermediation of a suitable power transmission; the present preferred arrangement being one in which the engine body or casing is mounted by anti-friction bearings in or on the body of the aircraft and is directly connected with the hub of the rotating wing system to turn as a unit therewith, the engine crank shaft being connected by any suitable power transmission, such as shafting and gears, to airscrews which are mounted upon the rotating wings or blades, said airscrews being preferably of a substantially constant-speed type and driven by the engine crank shaft at a relatively high R. P. M. as compared with the R. P. M. of the rotary wings or blades; the engine further being preferably mounted on an axis coinciding with the hub axis but axially spaced from the plane of the rotor blades.

The invention further involves an aircraft having a rotary bladed propulsion system and a rotary bladed lifting system, at least one of which incorporates the essentials of the mechanism above described; and in cases where only one of said systems incorporates the torque cancelling drive, the invention additionally involves a control mechanism whereby the thrust line of the latter may be shifted in a manner to balance the torque reaction of the other system and/or to control the flight of the craft.

Still further, the invention involves a driven rotor system of the character above described incorporating means, preferably automatic, for effecting variation of the rotor blade pitch, whereby, upon application of the power, the blade pitch is increased to the optimum value for propulsion or direct lift, and upon cutting off or failure of the power drive the pitch is reduced to approximately the optimum value for autorotational actuation of the rotor; and in the present preferred embodiment the blades are pivotally mounted for swinging movements generally transverse their rotative path and for variation of pitch conjointly with such swinging or flapping movements; in addition to which there is preferably incorporated a controlled differential pitch variation for effecting a shift of the rotor thrust line at will.

Still more specifically, the invention contemplates the provision, in a heavier than air machine, of a propeller for forward propulsion, preferably located adjacent the nose of the craft and driven by one engine, and a separate engine and rotor for lifting, sustaining and controlling the craft, the said rotor being disposed above the body or fuselage and having blades pivoted upon a hub there being a downward prolongation of the rotor hub which is connected to the casing of the engine, the latter being positioned well down in the body so as to lower the center of gravity of the craft and being mounted on anti-friction bearings so as to rotate as a unit with said hub, and the crank shaft of the engine having an extension passing upwardly inside said hub to a position adjacent the rotor head, whereat a step-up gearing is provided to actuate at high speed a plurality of relatively lightweight shafts, each shaft extending inside one of the rotor blades, substantially parallel with the main spar thereof to a point near the center of percussion of the blade, i. e. about two-thirds or three-quarters the tip radius of the blade, and being there coupled through bevel gearing to the shaft of an airscrew which latter is preferably of the single-bladed counterweighted type having a blade pivot so angled that with changes in relative speed of advancement due to the advancing and retreating of the rotor blades the pitch of said airscrew blade is automatically varied to approximate a substantially constant thrust at a substantially constant R. P. M., and the thrust line of said airscrew being so related to the torsional axis of the blade that when power is applied to the airscrew it introduces a positive pitching moment on the blade. Preferably the directions of rotation of the engine, the rotor, and the airscrews on the rotor blades, are such that when the engine crank shaft is rotating said airscrews in a direction to propel the blades about the axis of their common hub, the torque reaction of the engine casing (which is directly connected with the rotor hub) is in the same sense of rotation as the direction of rotation of the rotor itself. Although the opposite orientation is equally operative, it would, for a given rotor R. P. M., necessitate an increased engine power, i. e., it would be less efficient. Furthermore, by arranging the crank shaft to rotate in a sense opposite to the rotation of the engine casing and rotor hub (considered in an absolute sense) there is a partial cancelling out of the gyroscopic effects of these parts. It should be understood, however, that the broad aspect of the invention involves the operative interposition of the engine or motor device between the rotor hub and the propulsion means on the rotor blades, regardless of whether the engine reaction is in the same or a contrary sense in relation to the direction of rotation of the hub.

The invention further contemplates various structural arrangements for the mounting and support of the rotor and its engine, for the control of the machine by shifting the thrust line of the rotor, for the control of the ignition, throttle and fuel supply of the engine, and various other detailed features which will appear more fully from the following description, taken together with the accompanying drawings, wherein:

Figure 1 is a side elevational view of an aircraft embodying my invention, a portion of the body structure being broken away to show the engines and connections for driving the rotor and the traction propeller;

Figure 2 is a plan view of the aircraft shown in Figure 1;

Figure 3:
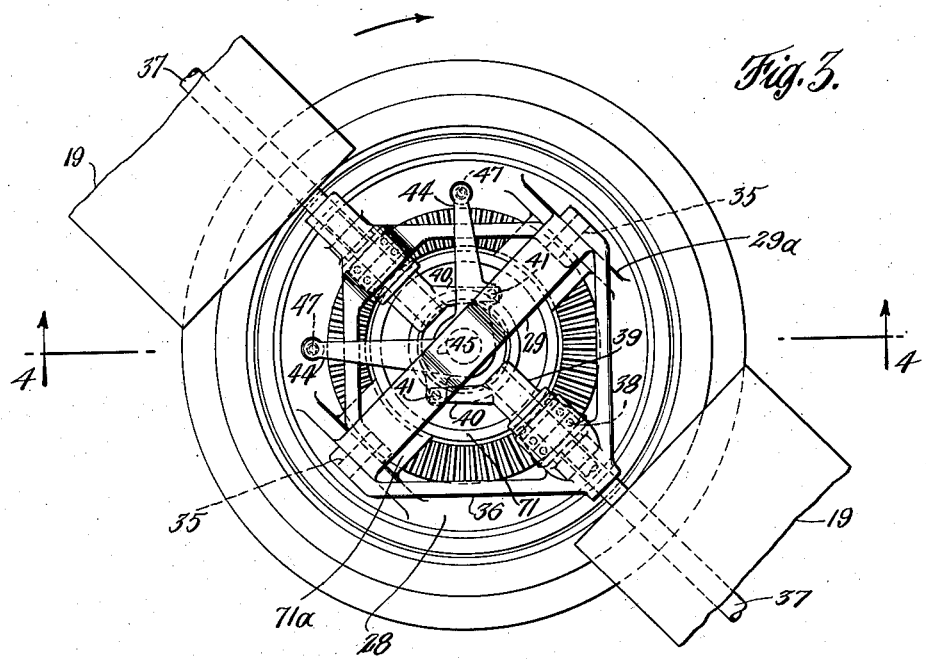
Figure 3 is a detail, in top plan, of the rotor hub of the machine shown in Figures 1 and 2, drawn to an enlarged scale.

Referring first to Figures 1 and 2, it will be seen that the air craft comprises a body or fuselage 7 having a cabin 7a and an upward extension or pylon composed of structural members 8, of any suitable number, enclosed in a fairing merging with the fuselage covering. The undercarriage comprises main wheels 9 mounted as by means of streamlined struts 10, and a tail wheel 11. At the rear end are the usual vertical or approximately vertical fins 12 and 13, horizontal stabilizer 14 and controllable rudder 15, the latter being within the slipstream of the propeller 16 which is located at the nose of the craft and driven by an engine 17. Any suitable fairing 18 encloses the rotor head, and extending out through this fairing are a pair of rotor blades 19 (the number of blades being immaterial to the invention), each blade carrying adjacent its leading edge an airscrew which is preferably though not essentially made up of a single blade 20 balanced by a counterweight 21, and pivotally mounted on the shaft or axis 22 by means of an oblique hinge 23.

Although the propulsion airscrew 16 and its engine 17 may be otherwise located, it is advantageous to locate them as shown in Figure 1, that is with the engine 17 placed adjacent the bottom of the fuselage, relatively close to the axis of the rotor, and driving the airscrew by means of an upwardly and forwardly inclined shaft 17a which is coupled to the propeller 16 through a gear box 16a, it being unnecessary to show the details of this driving arrangement, as suitable driving systems will be found in the copending applications of Ray, Pitcairn and Larsen, Serial No. 14,304, filed April 2, 1935, issued Oct. 3, 1939, as Patent No. 2,174,946, and Harris S. Campbell, Serial No. 131,944, filed Mar. 20, 1937. However, in contrast with the arrangements shown in said copending cases, I arrange the engine 17 to lie on its side, and in this embodiment have employed a four-cylinder "opposed type" engine (two of the cylinder heads being shown in Figure 1, and the other two being disposed toward the opposite side of the craft), this disposition of the engine 17 being adapted to interfit with the engine for driving the rotor, in a compact way, and in such manner that both of the heavy engine units are located relatively close to the center of gravity of the craft, the approximate position of which is indicated at G, near the intersection of the propeller thrust line and the rotor axis.

A separate engine 24, located near the bottom of the fuselage, and desirably in overlapping relation to the engine 17 (as shown), is mounted on a vertical axis by means of anti-friction bearings 25, 25, which in turn are mounted in fixed structural parts of the fuselage (fragmentarily indicated at 25a), the casing 24a of the engine being rigidly connected by the torque tube 26 to the hub of the rotor, and the crank shaft of the engine having a tubular extension 27 passing upwardly through said tube 26 for connection, by means of gearing and shafting hereinafter to be described, to the shafts 22 of the propellers 20. A fuel tank for the engines is indicated at F, the same being disposed to utilize a portion of the remaining space beneath the engine 24, and centrally beneath the engine is a group of rotative control connections, generally designated by the letter C, which will later be described with reference to Figure 7.

Since the engine crank shaft is coupled up to the driving means (i. e. airscrews 20) on the rotor blades, and the reaction of the engine itself is taken by the rotor, more specifically, through the rotor hub, the entire energy of the engine, aside from losses, such as friction and propeller losses, is effectively used for driving the rotor. Though not limited thereto, the preferred directions of rotation of the driving tubes 26, 27, and of the rotor 19 and airscrews 20, are shown by curved arrows in Figures 1 and 2. With this orientation of the rotative parts, the engine itself tends to turn the rotor in the desired direction of rotation, and the crank shaft actuates the airscrews on the blades in senses to pull said rotor around in the same direction. There is no appreciable reaction upon the body of the craft, from the engine 24, except such as results from the small friction of the bearings 25, 25 which serve to mount the engine.

Figure 4:
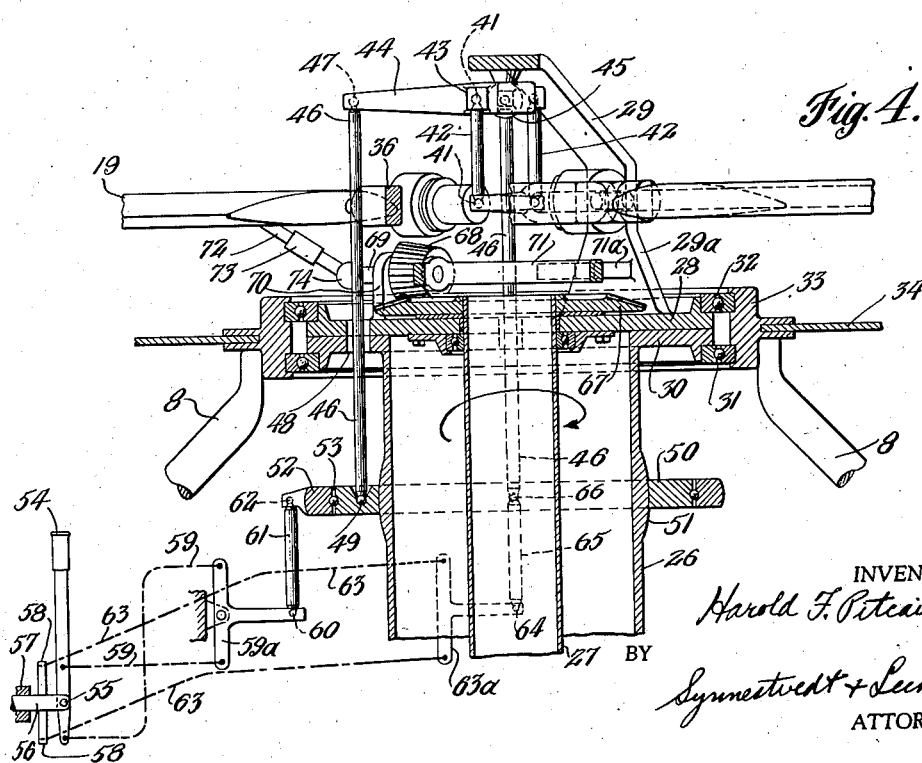
Figure 4 is a vertical section through the structure of Figure 3, with certain parts at the rotor center shown in elevation and diagrammatically showing the rotor control connections.

Turning now to Figures 3 and 4, which show the rotor head with the streamlined fairing removed, it will be seen that the rotor hub comprises a main base member 28 having an integral cross yoke or bridge 29 which is roughly in the shape of an inverted U. The baseplate 28 is fixedly secured by any suitable means to the upper flange 30 of the torque tube or rotor hub extension 26. Positioning of the rotor head, supplemental support of the driving tube 26, and transmission of the lift thrust of the rotor to the body are accomplished by means of the bearings 31 and 32, interposed between ribs formed on the parts 28 and 30 on the one hand, and grooves or the like formed on the annular pylon apex structure 33 on the other hand, the pylon legs 8, 8, serving to secure the apex member 33 rigidly to the body of the craft. The pylon sheathing 34 may be fitted into a peripheral groove or slot formed on the pylon apex member 33.

The two upstanding legs 29a of the U-shaped yoke 29 are apertured to receive the flapping pivot pins 35 which serve to pivot the fork fittings 36 for up and down flapping of the associated blades 19. The tubular main spars 37 of the blades extend each through a bore in one of the fork fittings 36, each blade root being rotatively mounted for pitch change of the blade, by means of bearings 38, there being a shouldered member 39 rigidly secured on the inner end of the blade spar to hold the blade as against the action of centrifugal force. The member 39 carries an arm 40 extending laterally therefrom in the direction of the leading edge of the blade, and the two arms 40 are connected by universal joints 41 to the lower ends of links 42, the upper ends of which are secured by similar universal joints 41 to ears 43 which are formed upon a double-arm rocking member 44. As will be seen from Figure 3, the connection of each vertical link 42 to the rocking control member 44 and to the blade incidence control arm 40 is offset (in plan) from the axis of the blade flapping pivot means 35, with the result that individual flapping of a blade about the axis 35 results in variation of the pitch of that blade, assuming that the rigid control member 44 is held in a predetermined position; the blade decreasing its incidence as it flaps upwardly and increasing its incidence as it flaps downwardly. The length of the blade pitch control arm 40, and the degree of horizontal offset between the control connection 41 thereto and the axis of the flapping hinge 35, is not to be limited to that shown in the drawings, as it will be obvious that by altering these proportions the amount of blade pitch variation accompanying a given flapping movement of the blade on its hinge 35, may be altered to suit different conditions.

For purposes of effecting controlled feathering, that is differential control of the blade incidence, the control member 44 is mounted on a universal or ball joint 45 located on the under face of the yoke member 29, so that the member 44 can be tilted to lie in any desired plane of inclination. The tilting of said member is effected by means of a pair of push-pull rods 46 having ball joint connections 47 with the two arms of said member 44, the rods 46 extending downwardly through apertures 48 in the rotor head, and the lower ends of said rods having ball joint connections 49 with a tiltable control ring 50.

The ring 50, and all the parts connecting the same to the rotor blades, rotates with the hub, but can be tilted in any direction, on the spherical mounting 51 which is formed on the exterior of the hub extension 26. An external, non-rotative, ring 52 is mounted on the ring 50 by ball bearings 53, and the latter ring is controlled from the main control lever or stick 54 in the occupants' cabin, by means of the connections now to be described.

The stick 54 is pivoted at 55 upon a torque tube 56 mounted in any suitable fixed bearings 57, said tube carrying a pair of control horns or arms 58. Rocking of the stick 54 on its pivot 55 actuates the control wires or cables 59 which are coupled to a double bell crank 59a, which has a ball joint connection at 60 with a vertical link 61 coupled by a ball joint 62 to the non-rotative control ring 52.

Rocking of the control stick about the axis of tube 56, i. e. in a plane at right angles to that first mentioned, actuates the cables 63, which are coupled at one end to the control horns 58 and at the other end to the double bell crank 63a. This bell crank has a ball joint connection 64 with a vertical push-pull rod 65, which in turn has a ball joint connection 66 with the non-rotative control ring 52, the two connections 61 and 65 being coupled to said ring 52 at positions which are 90° apart.

The connections from the control stick 54 to the control ring 52 are shown purely diagrammatically, suitable pulleys (not shown) being provided for the cables wherever needed; but it will be understood that the orientation of these connections, with reference to the connection of the control member 44 to the incidence control arms 40 of the blades, should be such that the control variation of differential pitch of the blades will be in a sense to move the thrust line of the rotor to cause a maneuvering of the craft in accordance with the instinctive moving of the stick by the pilot. This type of direct control by pitch variation is fully described and illustrated in the copending application of Juan de la Cierva, Serial No. 698,372, filed November 16, 1933, and in the corresponding British Patent No. 410,532, and need not be further described herein.

Figure 5:
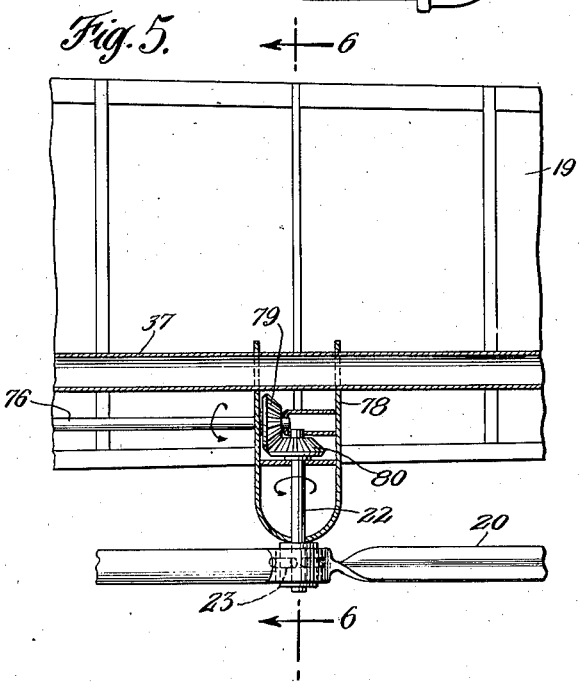
Figure 5 is an enlarged fragmentary horizontal sectional view through one of the rotor blades, illustrating the bevel gear connection to the shaft of the airscrew mounted on the blade.
Figure 6:
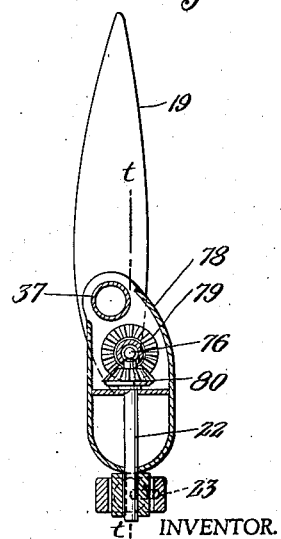
Figure 6 is a transverse section on the line 6—6 of Figure 5, with the blade shown in outline.

With reference now to Figures 4, 5 and 6, it will be seen that the upper end of the tubular crank shaft extension 27 fixedly carries a crown gear 67, suitable bearings being interposed between the hub structure 28 and the shaft and gear 27 and 67. Gear 67 meshes with two bevel gears 68, each fixed on a shaft 69. The shafts 69 are each mounted by two bearings, one in the upstanding ear 70 and one in the annular member 71 which forms part of a cross-brace 71a connecting the legs of the yoke 29.

For each rotor blade, an inclined shaft member 72, having a slip joint 73, is coupled by a universal joint 74 to one of the shafts 69 and by another universal joint 75 to the main shaft 76 extending longitudinally inside the blade parallel to the blade spar 37 on which it is mounted by a series of bearings 77, 77, (see Figure 1). Near the center of percussion of the blade (roughly two-thirds to three-fourths the tip radius) the shaft 76 terminates in a gear box 78, secured to the spar 37, wherein a bevel gear 79, secured to the shaft, is in mesh with another bevel gear 80 secured to shaft 22 of airscrew 20. The directions of rotation of these parts are shown by curved arrows in Figure 5.

As before indicated with reference to Figure 1, the airscrew 20 with its counterweight is mounted upon the shaft 22 by a pivot 23 at suitable obliquity, for example with the axis of said pivot forming an acute angle to the longitudinal axis of the propeller blade at the leading edge of the latter, so that an increase of the thrust of the airscrew is accompanied by a decrease of pitch, whereby the airscrew tends to maintain a substantially uniform thrust with a substantially uniform R. P. M., under the various working conditions which it encounters during the rotation of the rotor while the machine is moving translationally. The hinging of the airscrew blade and weight also eliminates the detrimental effect of gyroscopic percussion which would otherwise occur and would impose stresses on the rotor blades.

Since it is desirable to run the shafts 76 and associated driving parts mounted in the rotor blades at a low torque and high R. P. M., in order to reduce the size and weight of such parts, the gears 67 and 68 at the hub are designed to produce a number of turns of the shafts 76 and thus of the airscrews 20 for each turn of the engine crank shaft 27. By way of example, but not in limitation of the invention, the gears 67 and 68 may have a ratio of 1 to 3. Assuming now that the rotor is designed to turn at 300 R. P. M. and that the engine crank shaft is turning at 1800 R. P. M. with relation to the engine casing, and further that all of the parts are so orientated that with relation to an absolute frame of reference the engine and its crank shaft are turning in opposite directions, it will be seen that in an absolute sense the engine casing along with the rotor will be turning in one direction at 300 R. P. M., and that the crank shaft will be turning in the opposite direction at 1500 R. P. M. (i. e. engine speed minus rotor speed), with the result that if the masses of these two oppositely rotating bodies are properly proportioned, their gyroscopic effects can be made to partially or wholly cancel out. At the same time, the relative speed between the engine casing and its crank shaft will, of course, be 1800 R. P. M., which with a gear ratio of 1 to 3 will rotate the airscrews at 5400 R. P. M. It is not essential that single-bladed airscrews be employed, but it will be readily seen that greater efficiency will result as compared with a two-bladed airscrew when operating at such a high R. P. M.

It will be observed from Figure 6 that the shafts 76 and 22 are below the level of the blade spar 37, which latter is centered close to the torsional axis of the blade, and thus that the airscrew thrust line t—t acts in a direction to tend to increase the blade pitch when power is applied to the airscrew. The control arms 40 of the blades, if held in a given position, prevent a pure pitch change movement of the blade at the root, but the positive pitching moment imposed by the airscrew thrust will by reaction against the control arm tend to move the blade toward a lowered position of coning and thus of increased pitch. In addition, the positive pitching moment will further increase the average pitch of the blade by elastic torsional deformation thereof. Furthermore, the application of power to the airscrews on the blades increases the rotor R. P. M. as compared with its autorotational R. P. M., which thus acts to lower the coning angle of the blades and thereby increase their pitch. The rotor thus fulfills the requirements of an increased pitch for helicopter operation and an automatically decreased pitch for autorotational operation when the power is off.

Figure 7:
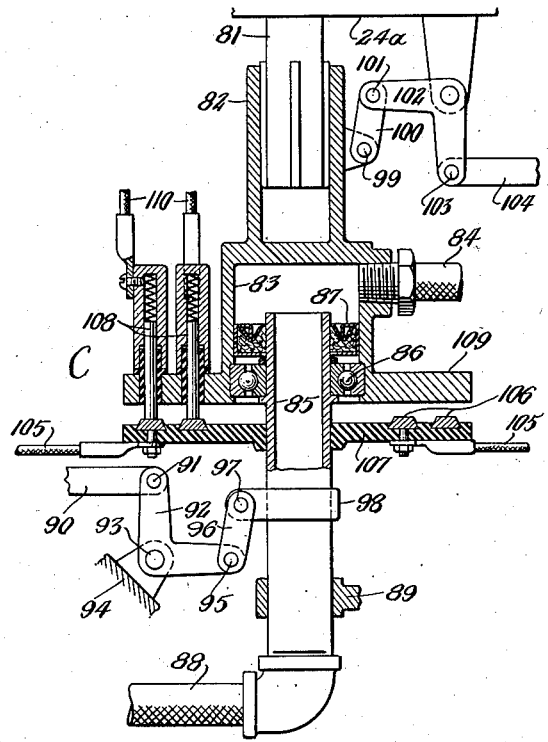
Figure 7 is a vertical section, with parts in elevation, through the fuel and control connections to the engine of the rotor, drawn upon an enlarged scale.

By reference now to Figure 7, showing the details of the control assembly C of engine 24, it will be observed that the gasoline and control connections to the engine are of a rotative nature and are located substantially on the axis of the engine (as seen in Figure 1). A portion of the bottom of the engine casing is shown at 24a, and to this is fixedly secured a splined member 81 engaging a cooperating splined member 82 which is vertically slidable thereon and rotates therewith. The member 82 carries a fuel chamber 83 from which a flexible pipe 84 leads to the engine carburetor (not shown). The chamber 83 is rotatable but axially fixed with respect to the fuel inlet pipe 85, by means of the bearing assembly 86, the rotative joint being made fluid tight by the seal 87, fuel being delivered to the pipe 85 from the tank F (Figure 1) by means of the flexible tube 88.

The fuel pipe 85 is vertically slidable in a fixed guide member 89. A link 90, connected to the pilot's throttle lever (not shown) is pivotally coupled at 91 to one arm of a bell crank 92, which latter is pivoted at 93 on a fixed support 94. The other arm of the bell crank is pivotally connected by pin 95, link 96 and pin 97 to a collar 98 which is fixedly secured upon the fuel pipe 85. Actuation of the throttle lever in the cabin thus moves the fuel pipe 85 vertically, and this carries with it the assembly 82, 83, thereby actuating the carburetor throttle by means of the pivots and linkage 99, 100, 101, 102, 103 and 104, the last mentioned element being coupled with the throttle member of the carburetor.

Wires 105, leading from the ignition switch (not shown) are coupled to the contact rings 106 which are mounted on an insulating base 107 carried fixedly by the fuel pipe 85. A pair of spring pressed contact plungers 108 have an insulated mounting, as shown, in the flange 109 of the rotating body 83. As this assembly rotates, these contact members 108 travel around the contact rings 106. The ultimate connections to the ignition system on the engine are made by the wires 110.

From the foregoing it is obvious that all of the control connections to the engine are made in a compact, central region, at the bottom face of the engine. The particular type of engine employed is not material to the invention, nor is the type of cooling, as the engine may be of the liquid-cooled type or the air-cooled type. If of the latter type, a blower system similar to that employed in the above mentioned application 14,304, may be here used.

From the foregoing description of the preferred structural embodiment, the general operation of the machine will be readily understood. The rotor blades 19, driven by the engine 24, could be employed as the sole means of sustension, propulsion, and control (the propeller and engine 16 and 17 being eliminated entirely, if desired), but the combined arrangement has certain very practical advantages, especially when each engine is of adequate power to operate the craft by itself. For instance, the machine can be operated substantially as an "Autogiro," by utilizing the propulsion means 16, 17, and allowing the rotor 19 to turn autorotationally, there being relatively little drag or retardation imposed on the autorotative action of the rotor by the airscrews 20, and almost nil by the engine 24. Alternatively, the machine can be operated substantially as a pure helicopter, with vertical ascent and descent, hovering flight, and even translational flight by utilizing the blade pitch control system to incline the thrust line of the rotor in the desired direction of travel. A combination of the two styles of flight is furthermore obtainable, thereby providing great flexibility in the matters of take-off angle, speed, control, maneuverability, etc. In addition, the machine can fly with both motors in operation, or with either one of them alone, under full control, so that a wide measure of safety is afforded, the safety factor being further enhanced by the automatic raising and lowering of the mean blade pitch to suit power-driven and autorotative conditions of the rotor.

All of the foregoing is accomplished by a mechanism which obviously eliminates the torque reaction problem, the gyroscopic problem, and numerous other problems of the prior art enumerated hereinabove. The location of the engines well down in the body of the machine results in a lowering of the center of gravity, which increases the stability and also makes possible a lowering of the tractor propeller and improvement of the angle of vision from the cabin.

While a torque cancellation drive such as used on the lifting and sustaining rotor could also be applied to the tractor propeller, this would not normally be necessary, since the rolling moment of the latter is normally not excessive, and in any event is opposed by the inherent stability of the machine in roll and may if desirable be further counteracted by the usual twist in the tail surfaces and/or a suitable lateral inclination of the rotor axis or utilization of the rotor control system in the lateral sense.

The general arrangement and disposition of the engines, rotor drive shaft, etc., is such that much of the weight is concentrated compactly so that the fuselage structure may as a whole be made relatively light. The arrangement of the control connections to the rotating engine at the face opposite to that where the driving connections are taken off, and the concentration of said connections adjacent the engine axis, results in a minimum of complication in making the necessary rotative joints. Various other advantages will occur to those skilled in the art.

I claim:

1. An aircraft, including a sustaining rotor incorporating a rotative hub, and blades mounted thereon, a propulsive airscrew carried by each blade and a forward propulsion airscrew adjacent the nose of the craft, an engine located near the center of gravity of the craft and connected to drive said forward propulsion airscrew; a second engine at least partially overlying the first engine and mounted to rotate as a unit with the hub, and an engine shaft extended through the hub and connected to actuate the blade airscrews; the directions of rotation of the second engine, its shaft and the rotor being such that when the engine shaft rotates said blade airscrews, the torque reaction of the engine itself is additive to the rotational force exerted on the rotor by the blade airscrews.

2. In an aircraft, a bladed sustaining rotor, and a propulsive airscrew mounted on a blade of said rotor with its thrust line passing below the torsional axis of the blade, so that the line of thrust of said airscrew acts in a direction tending to raise the blade pitch from a lower to a higher value upon application of power to said airscrew.

3. In an aircraft, a bladed sustaining rotor including a blade element movable into and out of the autorotational range of pitch, and a propulsive airscrew mounted on a blade of said rotor with its thrust line passing below the torsional axis of the blade, whereby the blade pitch angle is maintained above the autorotational range, during driving of the airscrew, and falls within said range upon cessation of the drive.

4. An aircraft including a bladed sustaining rotor, a propulsive airscrew mounted on a blade of said rotor with its thrust line passing below the torsional axis of the blade, whereby the thrust of said airscrew acts in a direction tending to raise the blade pitch from a lower to a higher value upon application of power to said airscrew, and a motor device operatively interposed between said rotor and said airscrew and connected to expend its reaction, on the one hand in imparting a direct rotative effort to the rotor, and on the other hand in actuating said airscrew.

5. An aircraft including a bladed sustaining rotor, controllable means for shifting the lift line of the rotor with respect to the center of gravity of the craft comprising a pitch varying mounting for a blade of the rotor and means for effecting periodic change in blade pitch at different points in the cycle of rotation of the blade; an airscrew mounted on a blade of said rotor with its thrust line passing below the torsional axis of the blade, whereby the thrust of said airscrew acts in a direction tending to raise the blade pitch from a lower to a higher value upon application of power to said airscrew; and a motor device operatively interposed between said rotor and said airscrew and connected to expend its reaction, on the one hand, in imparting a direct rotative effort to the rotor, and on the other hand, in actuating said airscrew.

6. An aircraft, including a sustaining rotor incorporating a rotative hub and blades mounted thereon, a propulsive airscrew mounted on each blade of said rotor with its thrust line passing below the torsional axis of the blade, whereby the blade pitch angle is maintained above the autorotational range, during driving of the airscrew, and falls within said range upon cessation of the drive, and a forward propulsion airscrew adjacent the nose of the craft, an engine located near the center of gravity of the craft and connected to drive said forward propulsion airscrew; a second engine at least partially overlying the first engine and mounted to rotate as a unit with the hub, and an engine shaft extended through the hub and connected to actuate the blade airscrews; the directions of rotation of the second engine, its shaft and the rotor being such that when the engine shaft rotates said blade airscrews, the torque reaction of the engine itself is additive to the rotational force exerted on the rotor by the blade airscrews.

7. An aircraft including a bladed sustaining rotor, a propulsion airscrew mounted on a blade of the rotor, an engine connected to expend its reaction between the rotor itself and said propulsion airscrew, and means for effecting automatic periodic variation of effective pitch of said airscrew, in accordance with the period of rotation of the rotor, whereby the airscrew tends to maintain a substantially uniform thrust, throughout the cycle of rotation of the rotor while the machine is moving translationally.

HAROLD F. PITCAIRN.